Oct. 24, 1933.  C. B. SMITH  1,932,165
EQUALIZER FOR VEHICLE SPRINGS
Filed May 11, 1931  2 Sheets-Sheet 1
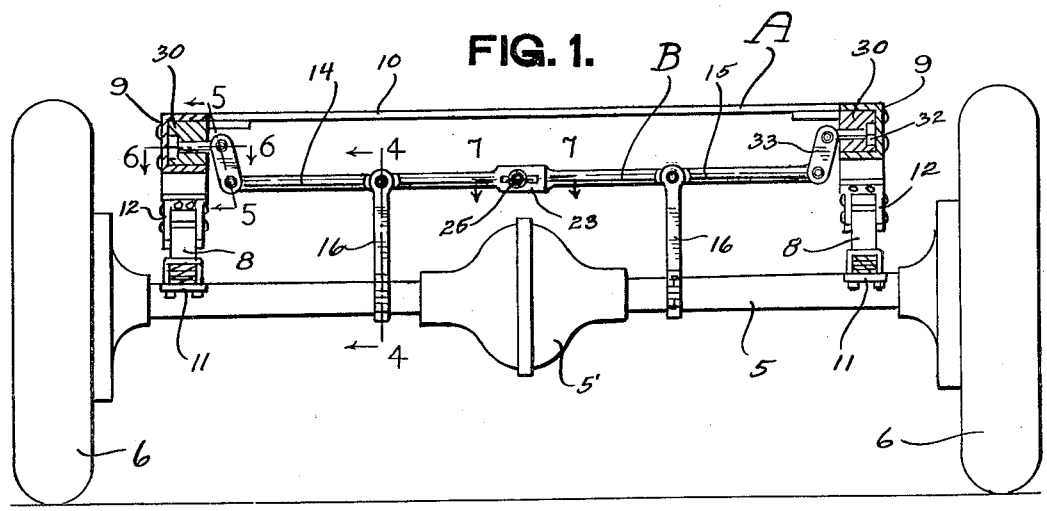
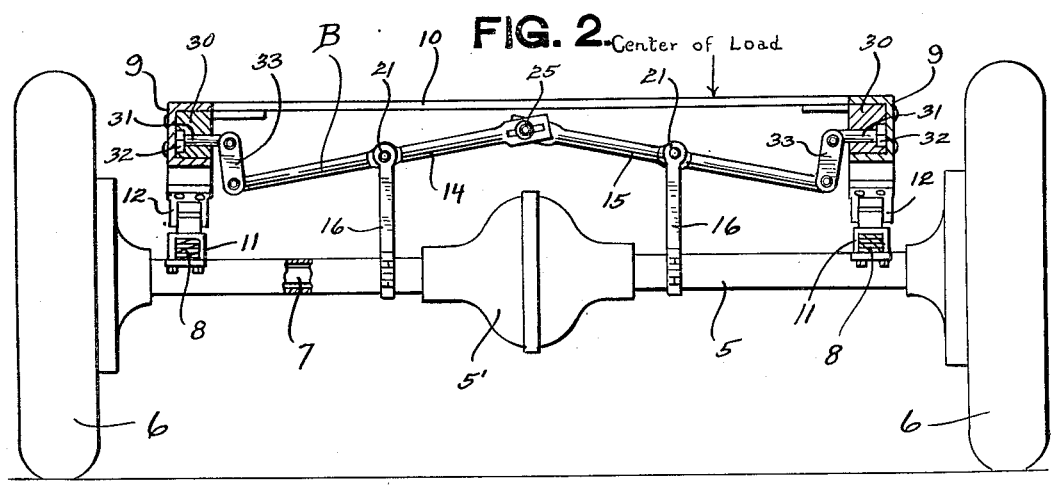
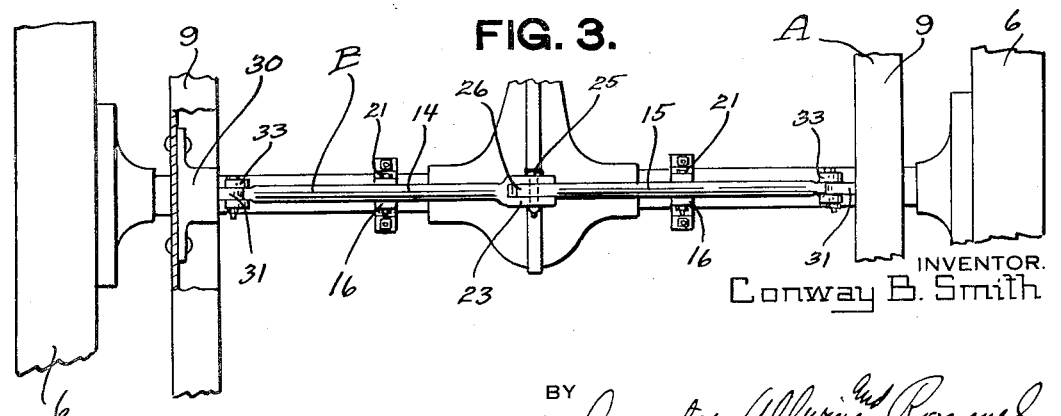
INVENTOR.
Conway B. Smith
BY Lancaster, Allwine and Rommel
ATTORNEYS.

Oct. 24, 1933.    C. B. SMITH    1,932,165

EQUALIZER FOR VEHICLE SPRINGS

Filed May 11, 1931    2 Sheets-Sheet 2

INVENTOR.
Conway B. Smith

BY Lancaster, Allwine & Rommel
ATTORNEYS.

Patented Oct. 24, 1933

1,932,165

UNITED STATES PATENT OFFICE 1,932,165

EQUALIZER FOR VEHICLE SPRINGS

Conway B. Smith, Portsmouth, Va., assignor to Equalizer Incorporated, Portsmouth, Va., a corporation Application May 11, 1931. Serial No. 536,603

7 Claims. (Cl. 267—11)

The present invention is a spring equalizing means primarily intended for use upon motor vehicles and the primary object of the invention is to provide a device for evenly distributing the load upon vehicle springs.

A further object of the invention is to provide an equalizer for vehicle springs which may be readily applied to existing types of vehicles to prevent listing of the vehicle body due to uneven distribution of weight.

A further object of the invention is to provide a device of this character which will prevent breaking of a spring due to one wheel of the vehicle engaging an obstruction or dropping into a rut, by causing an equalizing yielding action of the springs at both sides of the vehicle.

A further object of the invention is to provide a spring equalizer for motor vehicles which is so associated with the vehicle chassis as to permit proper functioning of the springs since the equalizer has no direct connection with the springs.

Other objects and advantages of the invention will be apparent during the course of the following detailed description, taken in connection with the accompanying drawings forming a part of this specification and in which drawings:—

Figure 1 is a fragmentary transverse section thru a vehicle chassis at a point just rearwardly of the rear axle housing and showing the improved spring equalizer applied.

Figure 2 is a view similar to Figure 1 but showing the condition of the equalizer when a load is placed upon the springs.

Figure 3 is a top plan view of the showing in Figure 1.

Figure 4:
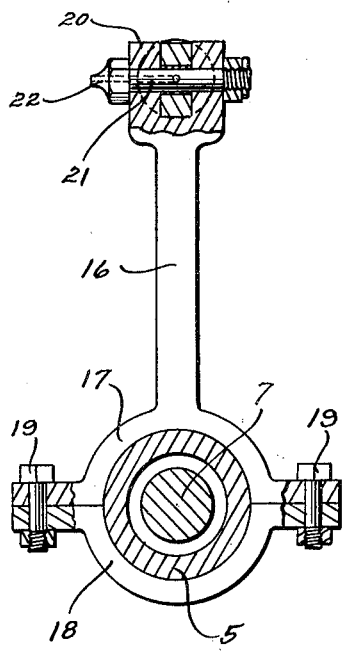
Figures 4, 5, 6 and 7 are enlarged fragmentary detail sections on the respective lines in Figure 1.
Figure 5:
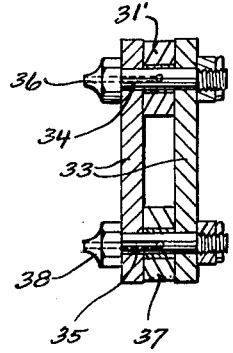
Figure 6:
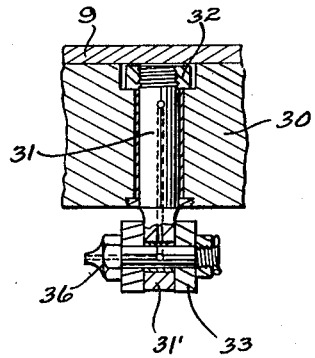

Referring to the drawings in detail, and wherein similar reference characters designate corresponding parts thruout the several views, and referring particularly to the form of invention shown in Figures 1 to 7 inclusive, the letter A designates a vehicle chassis of conventional construction provided with an equalizer B.

The numeral 5 designates a rear axle housing of the chassis A and 6 the rear wheels mounted upon the axle 7 enclosed by the housing 5. Supported upon the axle housing 5 as by the usual semi-elliptic springs 8, is the main frame of the vehicle including the channel side rails 9 connected by one or more cross bars 10. The springs 8 extend longitudinally beneath the side rails 9 and are connected to the axle housing 5 by means of suitable clips 11. The upturned ends of the springs 8 are connected by the usual spring hangers or brackets 12 to the side rails 9.

Referring particularly to Figure 2, when the weight or center of load is at the point indicated by the arrow, the spring at the right hand side of the view will yield considerably more than the spring at the left hand side of the view causing a decided list to the vehicle body and placing the greatest strain upon the right hand spring. The object of the equalizer B is to equalize the weight of the load upon both of the springs and cause the frame to move up and down in parallel relation to the axle housing 5 regardless of the center of load along the cross member 10.

Referring now to the device B, the same is adapted to be operatively connected between the main frame and the axle housing 5 and embodies a pair of lever arms 14 and 15 adapted to extend crosswise of the frame above the axle housing 5. The lever arms 14 and 15 are pivotally supported at a point substantially midway their ends upon supporting posts 16 secured in an upright position upon the axle housing 5 at points spaced equidistant to each side of the differential housing 5'. The supporting pivot posts 16 may be secured to the axle housing in any preferred manner and in the example shown, the lower end of each post is formed with an arched rest portion 17 adapted to seat upon the axle housing and secured in position by a clamping cap 18 bolted as at 19 to the rest portion 17. This manner of mounting the pivot posts permits attachment of the posts with no alteration being required to the axle housing. The upper ends of the posts 16 are forked as at 20 for pivotal mounting of the lever arms 14 and 15 upon suitable pivot bolts 21 provided at one end with a grease applicator fitting 22. The pivot bolts 21 extend at a right angle to the axle housing so that the lever arms 14 and 15 extend longitudinally above the axle housing and transversely of the vehicle frame.

Figure 7:
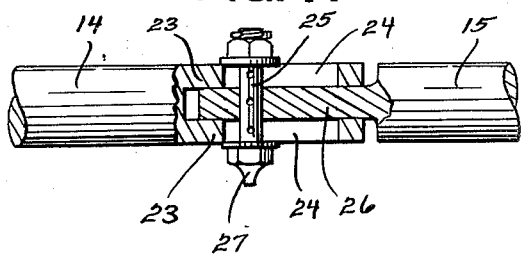

The inner ends of the lever arms 14 and 15 are joined by a pin and slot connection as clearly shown in Figure 7, the inner end of the lever 14 being forked providing arms 23 being longitudinally slotted as at 24 for slidably receiving the shank portion of a coupling bolt 25 extended thru the reduced stem portion 26 formed on the inner end of the lever 15 and extending between the arms 23. The coupling 25 may be provided with a grease applicator fitting 27. The pin and slot coupling for the inner ends of the lever arms 14 and 15 permits vertical swinging of the lever arms about their pivot bolts 21.

Mounted in the channel at the inner side of each of the frame side rails 9 is a metal bearing block 30 in which are rotatably mounted the shank portions of eye bolts 31. These bearing blocks or brackets 30 are secured to the side rails 9 directly above the axle housing 5 with the eye bolts 31 rotatable about an axis parallel to the axis of the axle housing. The eye bolts 31 may be held in the bearing blocks 30 in any preferred manner and in the example shown the eye bolts have a threaded end for receiving a suitable nut 32 arranged in an enlargement provided at the inner end of the opening receiving the shanks of the eye bolts.

The outer ends of the lever arms 14 and 15 are connected to their respective eye bolts by means of straps 33 having apertured upper and lower ends for respectively receiving upper and lower hanger bolts 34 and 35 respectively. The upper hanger bolts 34 are extended thru the eyes 31' of the eye bolts 31 and are provided with the grease applicator fittings 36. The lower hanger bolts 35 are extended thru eyes 37 provided at the outer ends of the lever arms 14 and 15, and these lower hanger bolts are also provided with grease applicator fittings 38.

In operation of the equalizer, and referring particularly to Figure 2 of the drawings, if the center of load be to one side of the longitudinal center of the vehicle body as indicated, without the equalizer the spring 8 supporting the right hand side of the body would quite naturally be sprung to a greater extent than the spring at the right hand side of the body and cause the vehicle body to tilt to the right from a horizontal position. This unequal distribution of weight also places additional strain upon the right hand spring and causes an unpleasing appearance to the vehicle. With the equalizer B applied, an equal pressure will be applied to both of the springs regardless of unequal distribution of weight upon the vehicle body. With the center of load at the point indicated, downward pressure upon the outer end of the lever arm 15 causes a corresponding downward movement of the outer end of the lever arm 14 in a manner as will readily be apparent. This lateral transfer of pressure will cause the frame side rails 9 to both lower to an equal degree and thus retain the vehicle body in its proper horizontal position regardless of the position of weight on the body. The manner of coupling the outer ends of the lever arms 14 and 15 to the frame side rails 9 permits ready up and down movement of the frame and allows for the slight forward and rearward relative movement of the rear axle housing 5 and the vehicle frame provided by the spring shackles connecting the springs 8 to the frame.

Figure 8:
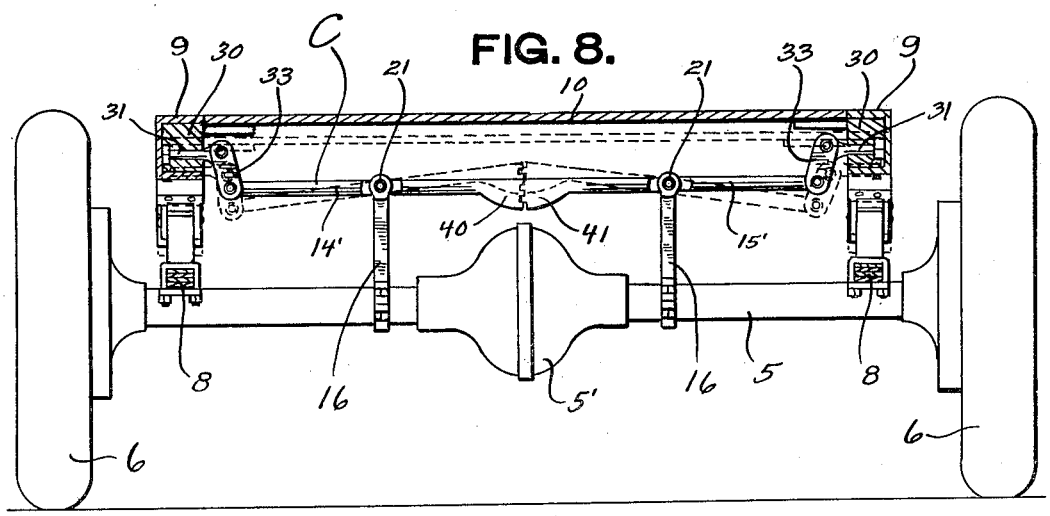
Figure 8 is a transverse sectional view thru a vehicle chassis showing a slightly modified form of equalizer.

Referring now to the form of equalizer C shown in Figure 8, with the exception of the lever arms 14 and 15 of the equalizer B, the equalizer C is of like construction and like reference characters have been applied to similar parts. In the equalizer C, the lever arms 14' and 15' are provided at their inner ends with toothed sectors 40 and 41 respectively, the teeth of which engage for imparting corresponding movement to both of the lever arms about their pivots 21.

While the equalizer has been shown associated with the rear portion of a motor vehicle chassis for equalizing pressure upon the rear springs and preventing listing or tilting of the vehicle body, it will readily be apparent that the device may be associated with other forms of spring supported bodies such as seats, platforms or other structures having spaced yieldable supports.

Changes in detail may be made to the forms of invention herein shown and described, without departing from the spirit of the invention or the scope of the following claims.

I claim:

1. In an equalizer for vehicle springs, the combination with the rear axle of the vehicle, springs mounted upon and anchored to the axle and a main frame including side rails of channel shape cross sections, said rails opening inwardly, mounted over and being connected to the ends of said springs, of a pair of spaced parallel posts secured to the axle and each located at a point nearer the transverse median of the axle than an end of the latter, a pair of oppositely extending horizontally disposed levers arranged over the axle and each pivotally connected substantially centrally thereof to the upper end of a post, said levers being interengaged at their inner ends, a pivot extending through said interengaged ends to provide for such ends moving relatively to each other, spaced parallel bearing blocks arranged within said side rails, a rotatable element coupled to and journaled in each block, said elements having their inner ends extending inwardly from the side rails, oppositely inclined shackle means pivotally supported at their lower ends from the outer ends of said levers, and means extending through the inner ends of said elements for pivotally connecting the upper ends of said shackle means therewith.

2. In an equalizer for vehicle springs, the combination of a pair of parallel spaced bearing blocks adapted to be secured to the side rails of the chassis of the vehicle, each of said blocks formed with an opening having an enlarged portion at one end, a pair of oppositely disposed levers adapted to be pivotally supported intermediate their ends from the rear axle of the vehicle, said levers having their inner ends interengaged with each other to provide for said inner ends moving relatively to each other, an eye bolt mounted in each of said openings and having its eye end positioned inwardly of the block, means engaging with the other ends of said bolts and arranged in said enlarged portions of said openings for anchoring the bolts to said blocks, a pair of oppositely inwardly inclined shackles permanently depending from said bolts, each straddling at its upper end the eye of a bolt and at the lower end the outer end of a lever, means for pivotally connecting the upper ends of the shackles to the eye ends of the bolts, and means for pivotally connecting the lower ends of said shackles to the outer ends of the levers.

3. In an equalizer for vehicle springs, the combination of a pair of parallel spaced bearing blocks adapted to be secured to the side rails of the chassis of the vehicle, each of said blocks formed with an opening having an enlarged portion at one end, a pair of oppositely disposed levers adapted to be pivotally supported intermediate their ends from the rear axle of the vehicle, said levers having their inner ends interengaging with each other, the said inner ends being formed with parallel slots disposed lengthwise with respect to the body of the levers, a pivot extending through the aligning slots to provide for said inner ends moving relatively to each other, an eye bolt rotatably mounted in each of said openings and having its eye end positioned inwardly of the block, means engaging with the other ends of said bolts and arranged in said enlarged portions for anchoring the bolts to the blocks, a pair of depending oppositely inwardly inclined shackles, each straddling at its upper end the eye end of a bolt and at its lower end the outer end of a lever, means for pivotally connecting the upper ends of said shackles to the eye ends of the bolts, and means for pivotally connecting the lower ends of the shackles to the outer ends of said levers.

4. In an equalizer for vehicle springs, the combination of the rear axle of the vehicle, a pair of spaced parallel vehicle springs mounted intermediate their ends upon and anchored to said axle, a chassis having its side rails seated on the ends of the springs and connected to the latter, said rails being of channel shape cross section and opening inwardly, parallel bearing blocks mounted within said side rails and having openings disposed transversely with respect to the rails, rotatable elements mounted in said openings, anchored at their outer ends to said blocks and having their inner ends apertured, said apertured ends extending inwardly from said blocks beyond said rails, the apertures in said inner ends being disposed at right angles to said openings, a pair of oppositely disposed levers arranged over the axle and having their inner ends interengaging with each other, spaced means mounted on said axle for pivotally supporting said levers intermediate their ends, and a pair of oppositely inwardly inclined depending shackles pivotally connected at their upper ends to the apertured inner ends of said elements and at their lower ends to the outer ends of said levers.

5. In an equalizer for vehicle springs, a pair of spaced posts, means for anchoring them to the rear axle of the vehicle, a pair of oppositely disposed straight levers, each pivotally connected intermediate its ends to the upper end of a post, one of said levers having a slot extending lengthwise of its inner end, the other of said levers having a forked inner end having the tines thereof slotted lengthwise and arranged on opposite sides of said slotted inner end, a pivot extending through said slotted inner end and tines, a pair of bearing blocks adapted to be anchored to the side rails of the chassis of the vehicle, said blocks being formed with openings having enlarged outer end portions, eye bolts rotatably mounted in said blocks and carrying means arranged in said enlarged outer portions for anchoring the bolts to the blocks, the eye ends of said bolts being extended inwardly from said blocks, a pair of depending oppositely inwardly inclined shackles, means for pivotally connecting the upper end of each shackle to the eye end of a bolt, and means for pivotally connecting the lower end of each shackle to the outer end of a lever.

6. In an equalizer for vehicle springs, a pair of spaced parallel posts, means for anchoring them upon the rear axle of the vehicle, a pair of oppositely disposed straight levers directly interengaging with each other at their inner ends, means for pivotally connecting said levers intermediate their ends to said posts, a pair of spaced parallel bearing blocks adapted to be carried by the side rails of the main frame of the vehicle, a pair of rotatable elements journaled in said blocks and having their inner ends extending inwardly beyond the blocks, a pair of oppositely inwardly inclined shackles arranged in permanent depending relation with respect to said elements, means for pivotally connecting the upper ends of said shackles to the inner ends of said levers, and means for pivotally connecting the lower ends of said shackles to the outer ends of said levers.

7. In an equalizer for vehicle springs, the combination of the main frame of the vehicle, the vehicle's rear axle housing positioned below said frame, a pair of vehicle springs mounted on and each connected intermediate its ends to said housing, said frame including side rails arranged in superimposed relation with respect to and connected to the ends of said springs, a pair of spaced parallel posts anchored upon said housing, a pair of oppositely disposed straight levers directly interengaging with each other at their inner ends, means for pivotally connecting said levers intermediate their ends to the upper ends of said posts, a pair of spaced parallel bearing blocks carried by said side rails, a pair of rotatable elements journaled in said blocks and having their inner ends extending inwardly beyond the blocks, a pair of oppositely inwardly inclined shackles permanently depending from the inner ends of said elements, arranged inwardly with respect to said bars and extending below the latter, means for pivotally connecting the upper ends of the shackles to the inner ends of said elements, and means for pivotally connecting the lower ends of said shackles to the outer ends of said levers.

CONWAY B. SMITH.